Jan. 9, 1934.  E. SAWYER  1,942,836
COUPLING FOR BELTS OR THE LIKE
Filed Dec. 5, 1932
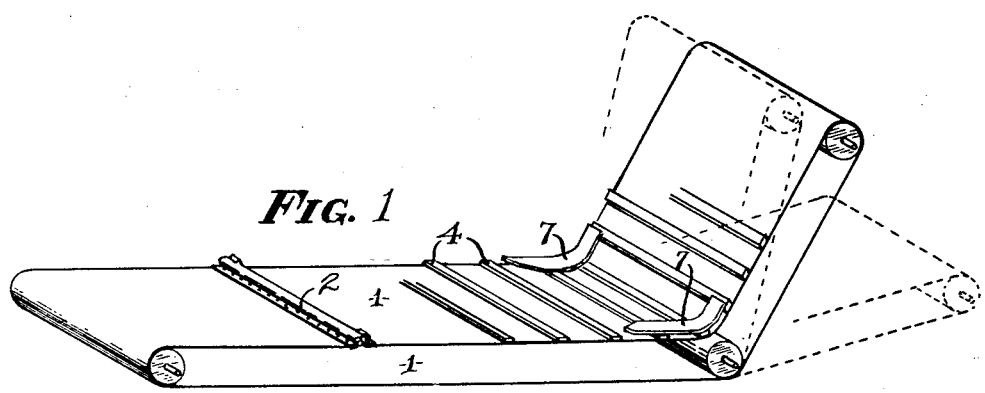
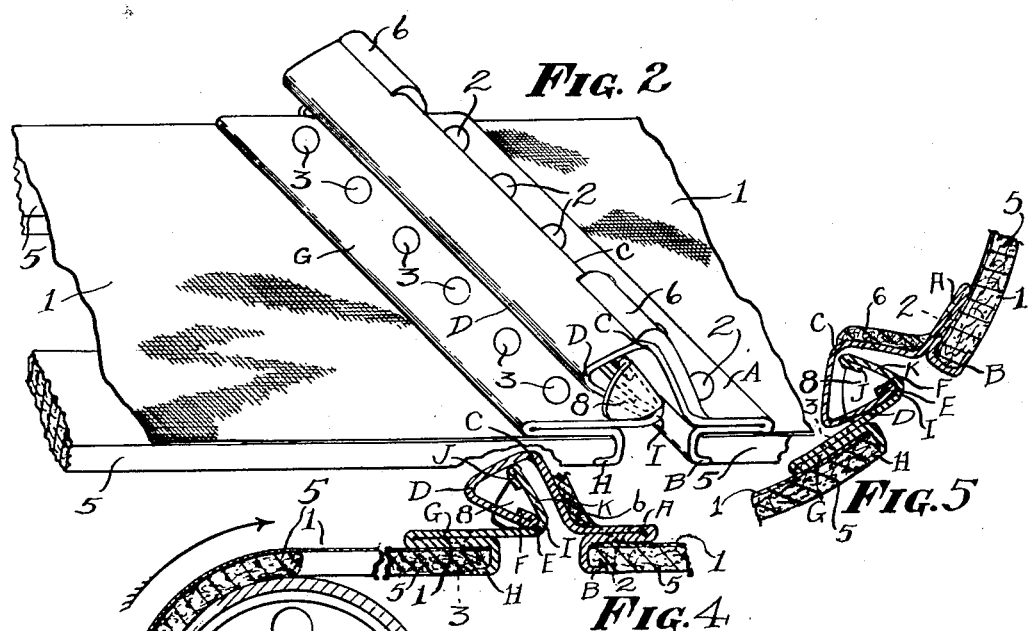
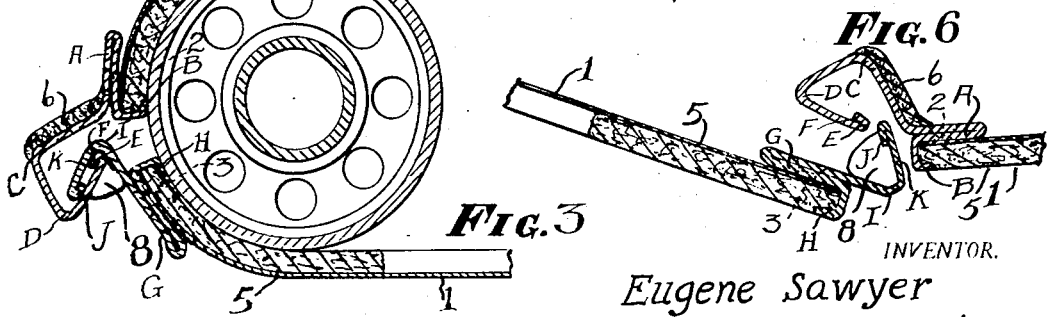
INVENTOR.
Eugene Sawyer
BY
ATTORNEY.

Patented Jan. 9, 1934

1,942,836

UNITED STATES PATENT OFFICE 1,942,836

COUPLING FOR BELTS OR THE LIKE

Eugene Sawyer, Benld, Ill.

Application December 5, 1932. Serial No. 645,809

4 Claims. (Cl. 24—33)

My invention relates to a coupling for belts or the like.

The object of my invention is to provide a coupling that will interlock to engagement whereby the use of tools or intricate maneuver to couple and uncouple the same is elminated.

A further object of my invention is to provide a coupling and means to attach each member to its respective end of a belt or the like in such a way that the tension is uniformly distributed along their respective members.

A still further object of my invention is to provide a coupling adapted to rock at their bearing connection as means to conform to the curvature of guides, pulleys, rollers, or the like engaging therewith in either direction or otherwise tensioned inward or outward with respect to the line of travel.

A still further object of my invention is to provide a stop feature to resist uncoupling should the belt or the like become slack by irregular exertion causing an abrupt rock of the coupling members with respect to each other.

A still further object of my invention is to provide a coupling adaptable as connecting means for drapers such as commonly employed as a conveyor for straw or the like in harvesting machinery, and the coupling outwardly projecting to the extent of cleats spaced along the draper and taking the place of one cleat.

These and other objects will hereinafter be more fully explained, reference being had to the accompanying drawing forming a part of this specification, and in which like characters will apply to like parts in the different views.

Referring to the drawing:—

Fig. 1 represents the adaptation of the conveyor as positioned operatively in a combine harvester and showing the possible rocking movement of the obliquely arranged portion when the horizontal portion is raised and lowered.

Fig. 2 is an enlarged perspective view of the coupling and fragmentary portion of the draper, all of which is reduced in width.

Fig. 3 is a sectional view thru a roller showing a rocked position of the coupling as it circumscribes the roller.

Fig. 4 is a cross sectional view of the coupling showing the position thereof as carried by the draper in straight alignment.

Fig. 5 is a cross section and fragmentary portion of the draper showing the coupling in a rocked position opposite to that in Fig. 3.

Fig. 6 is an exploded view prior to interlocking the coupling members.

My invention herein disclosed consists of a coupling member, one of the coupling members hereinafter referred to as the lead, and being formed of a single piece of metal lapped back on itself as at A. The lapped end portion having a return bend spaced apart as at B to receive the end portion of a flexible draper 1 fitting snugly therein and otherwise secured to each other by means of rivets 2 spaced therealong as shown in Fig. 2. The said lead member has a portion extending upward obliquely from the lapped portion A to a point C, and from thence a portion is bent at right angles to the last said portion to a point D and returning at an acute angle with respect to the last said portion terminating with an abrupt bent portion E lapping back on itself to form a shoulder F for the purpose later described. Said terminating point being spaced from the first named oblique positioned portion, and being thus formed a pocketed enclosure is arranged to receive a portion of the other coupling member hereinafter referred to as the follower.

The said follower being formed of a single piece of metal lapped back on itself to close engagement as at G, the edge of which has a return bend H spaced apart to receive the other end of the draper fitting snugly therein, and being otherwise secured by means of rivets 3 spaced apart as shown in Fig. 2. The said upper portion of the lapped portion closely engaging extends in straight alignment to a point I at which point it is bent upward and rearward to an acute angle, the outer edge thereof being lapped back on itself as at J forming a shoulder K to engage with shoulder C in the lead member when the said members are brought to interlocking engagement, and are moved to parallelism as shown in Fig. 2 should the said coupling members be moved toward each other, by which means free disengagement is obviated, and furthermore, the return bend at the terminating edge of each member is a means to reenforce and strengthen the edge portion.

Spaced along the said draper and secured thereto in parallelism is a plurality of cleats 4 that are commonly applied to drapers for the purpose of conveying straw or the like to avoid slipping of the same on the belt portion. The said cleats outwardly extend from the plane of the belt to alignment approximately with the outer extension of the coupling, but may be varied therefrom.

In the manufacture of drapers, a reenforcing flexible member 5 is marginally applied along each side and the ends, the ends being convenient and to which the coupling elements are riveted, it being understood that the body of the belt 1 consists of a flexible canvas structure or the like.

Positioned on the outer face of each end of the lead portion of the coupling is a flexible member 6 secured thereto functioning as a protection therefor against frictional wear as the same moves under a guide 7 positioned near the end portion as shown in Fig. 1. The said guides being carried by the frame of the machine which is not shown in the drawing.

As a means to avoid longitudinal movement of the coupling members with respect to each other, I have closed the ends of the follower member by heads 8 as shown in Figs. 2 to 6 inclusive. The said heads may be integral or may be separate parts welded in place.

In Fig. 1 is shown a possible rock of the vertically disposed portion of the conveyor that occurs by raising or lowering the horizontal portion to vary the height of the sickle engagement with grain that is being cut. The coupling therefor will adapt itself to the angle regardless the position. It will be understood that the conveying element is positioned on a platform in working relation to a sickle, but not shown in the drawing. There is also an over head conveying belt in parallelism with the vertically disposed portion and rockable therewith functioning to confine the straw in contact with the cleats for upward conveyance, the said belt has also been omitted from the drawing but mentioned to show operativeness, and furthermore my coupling may be applied to all such belt structures.

While I have shown and described the coupling elements formed in a specific way, I do not wish to be confined to such alone as other forms may be employed so long as the interlocking feature is maintained, and the terminating edges are lapped back on themselves to reenforce the same and for the other purpose described, and such other modifications may be employed as lie within the scope of the appended claims.

Having fully described my invention, what I claim as new and desire to secure by Letters Patent is:

1. In a coupling of the class described comprising a member of an appropriate length hooked in cross section, means to attach one side to the end of a belt, the other side upwardly and outwardly extending, another member of an appropriate length and hooked in cross section, means to attach the same to the other end of the belt, the hook portion upwardly and rearwardly positioned to interlock with the hook portion of the other member, means to avoid longitudinal movement in opposite directions with respect to each other.

2. In a coupling of the class described comprising a member of an appropriate length hooked in cross section, means to attach one side to the end of a belt, the other side upwardly and outwardly extending, another member of an appropriate length and hooked in cross section, means to attach the same to the other end of the belt, the hook portion upwardly and rearwardly positioned to interlock with the hook portion of the other member, means to avoid longitudinal movement in opposite directions with respect to each other, the terminating edges of the hook portions of each member lapped back on themselves as reenforcing means and as a detent to avoid free disconnection, and a head closing each end of one of the hook members to avoid longitudinal movement of either member with respect to the other.

3. In a coupling of the class described comprising a member formed from a single piece of metal to engage the end of a belt, the length being equal to the width of the belt, means to receive the end of the belt and means to secure the belt to the member, another member with similar means to receive the belt and secure the same to the member, each member having means to interlock with each other, and means on one of the members to retain the other member against longitudinal movement when the said members are interlocked, and means to permit free rocking movement of each member independent of the other.

4. In a coupling of the class described comprising in combination, a pair of coupling members, and a belt, each member having a similar means to receive the end of the belt, and means to secure the same to their respective ends of the belt, one coupling member having an upwardly and rearwardly positioned portion of the edge, and a head to close each end thus formed, the other member being formed hooked in cross section and reversed with respect to the form of the first said member to interlock therewith, a flexible member to cover a portion of the end of the last said member externally as a guard against frictional wear as the same passes under a guide, all as and for the purpose specified.

EUGENE SAWYER.